May 1, 1962 J. C. LAMAL 3,031,924
OBSERVATION SLIDE
Filed March 12, 1959
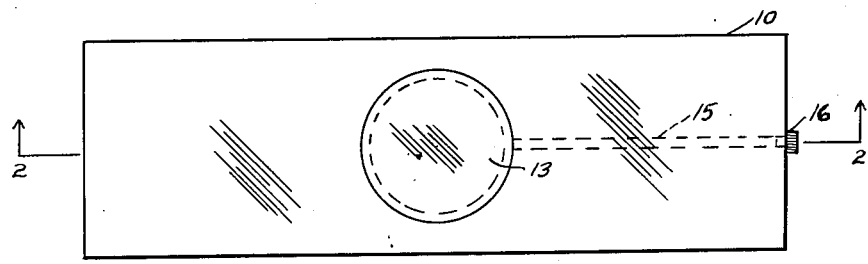
FIG. 1.
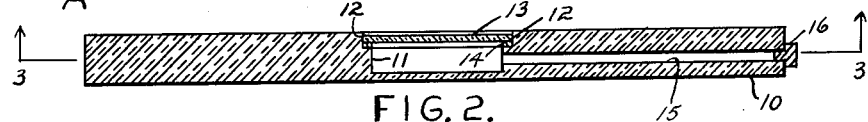
FIG. 2.
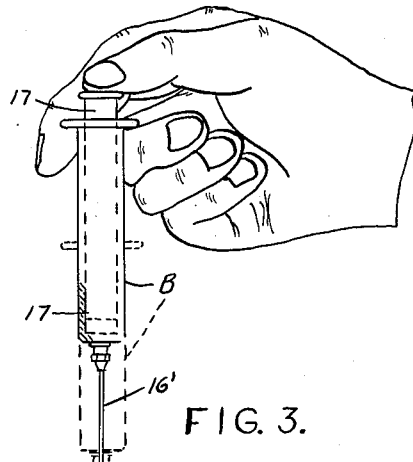
FIG. 3.
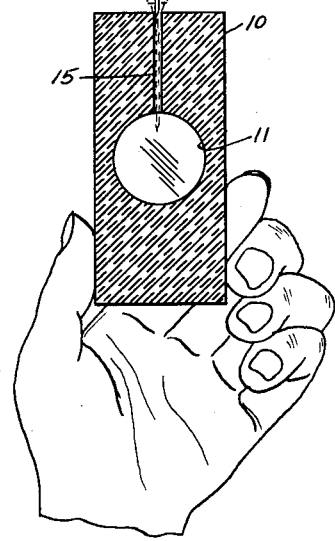
INVENTOR
JAMES C. LAMAL
BY Jack N. Wicks
ATTORNEY

United States Patent Office 3,031,924
Patented May 1, 1962

3,031,924
OBSERVATION SLIDE
James C. Lamal, 608 7th Ave. W., Ashland, Wis.
Filed Mar. 12, 1959, Ser. No. 798,907
1 Claim. (Cl. 88—40)

My invention relates to an improvement in a device generally used in connection with microscope work and more particularly to an observation slide used therewith.

It is an object of my invention to provide a slide for use with a microscope which has formed therein a culture dish.

It is also an object to provide a slide having a culture dish with means for placing material, such as protozoa for example, into the culture dish and excluding air therefrom thereby prolonging the time during which the material may be viewed.

It is a further object to provide a culture dish observation slide with which a constant culture field may be obtained and with which the culture may be easily removed.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

FIGURE 1 is a top plan view of my culture dish observation slide.

FIGURE 2 is a sectional view on the line 2—2 of FIGURE 1.

FIGURE 3 is a longitudinal sectional view of my device substantially on the line 3—3 of FIGURE 2, the cap being removed, with the tip of the needle of a hypodermic syringe positioned therein for insertion thereinto, the needle tip shown inserted all the way, in broken lines.

Referring to the drawings in detail, my culture dish observation slide A is composed of the relatively elongate flat rectangular body member 10. The body 10 may be circular or polygonal in formation. Extending into the top surface of the body member substantially centrally thereof is the circular cavity 11 in which a culture may be maintained in the manner hereinafter set forth. Further provided is the annular recess 12 formed in the body 10 around the periphery of the upper open end of the cavity 11. The cavity 11 is closed off at the top by means of a circular flat transparent cover slip 13 which fits snugly within the annular recess 12 and upon an annular gasket ring 14 to thereby completely seal off the cavity 11. The cover slip 13 may also be set in position in liquid plastic to completely seal the same.

The numeral 15 designates a hypodermic needle tunnel or conduit which leads from the side wall of the cavity 11 through the body 10 to the end of the body 10 where the same is closed off by the small cap 16. The body 10 is preferably made of clear plastic.

The matter to be observed is drawn into the hypodermic syringe B, and the needle 16' of the hypodermic B is inserted well into the conduit 15. The plunger 17 of the syringe B is then depressed, and the matter caused to fill the cavity 11 completely. Then by keeping a steady pressure on the plunger 17 as the needle is withdrawn, no air will be left in the cavity 11 or conduit 15. The conduit 15 is capped by the cap 16 as the needle is withdrawn.

If, for example, protozoa is deposited in my slide cavity 11, as outlined above, the same will live for weeks in the slide, and as a result one class after another can view the matter in its live state in the cavity 11. With present day conventional slides, protozoa dies in a matter of minutes. Also, with my device there is a constant culture field, no evaporation, and no spilling. Old matter can be withdrawn from the slide A with the hypodermic syringe B and the same rinsed out by means of the syringe B. The slide A may be placed beneath a microscope for observation of the matter in the cavity 11. Such is easily done due to the fact that the cover slip 13 is transparent and the portion of he body member 10 below the cover 13 is transparent.

The invention is not to be understood as restricted to the details set forth since these may be modified within the scope of the appended claims without departing from the spirit and scope of the invention.

Having thus described the invention, what I claim as new and desire to secure by Letters Patent is:

In an observation slide adapted for use with a microscope, a generally flat elongated transparent body, a central shallow cavity in said body in communication with the upper surface thereof, a transparent cover slip enclosing the upper surface of the cavity in said body, said body having a slender elongated conduit lying entirely therein communicating with said cavity and an end of said body, and means engageable with the interior surface of said conduit and the end of said body for removably sealing said cavity and said conduit, the diameter of said conduit being sufficient to allow the passage therethrough of a hypodermic needle.

References Cited in the file of this patent
UNITED STATES PATENTS

| 2,351,282 | Oliver | June 13, 1944 |
| 2,819,402 | Watson et al. | Jan. 7, 1958 |

FOREIGN PATENTS

| 667,896 | Great Britain | Mar. 12, 1952 |

OTHER REFERENCES

Bulletin 57-2, "Model 1292 Tissue Culture Perfusion Chamber," Electro-Mechanical Development Co., Houston, Texas, April 1, 1957, 2 pages.

Rose: "A Separable and Multipurpose Tissue Culture Chamber," Texas Report of Biology and Medicine, vol. 12, No. 4, pages 1074–1083.